United States Patent
Egawa (10) Patent No.: US 7,456,897 B2
(45) Date of Patent: Nov. 25, 2008

(54) IMAGE-TAKING APPARATUS FOR SETTING MAXIMUM EXPOSURE TIME AND CONTROL METHOD THEREFOR

(75) Inventor: Akira Egawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 619 days.

(21) Appl. No.: 11/003,522

(22) Filed: Dec. 6, 2004

(65) Prior Publication Data

US 2005/0128310 A1 Jun. 16, 2005

(30) Foreign Application Priority Data

Dec. 15, 2003 (JP) ............... 2003-417346

(51) Int. Cl.
*H04N 5/235* (2006.01)
*H04N 5/232* (2006.01)
*H04N 5/228* (2006.01)
*H04N 7/00* (2006.01)
*G03B 7/00* (2006.01)

(52) U.S. Cl. .............. 348/348; 348/208.12; 348/350; 348/351; 348/364; 396/65

(58) Field of Classification Search ........... 348/345, 348/208.12, 362, 364, 371, 218.1, 221.1, 348/222.1, 224.1, 227.1, 228.1, 229.1, 230.1, 348/240, 99, 236, 237, 238, 363, 365, 366, 348/370, 347, 346, 350, 351, 354, 355, 356, 348/361, 208.99; 396/65

See application file for complete search history.

(56) References Cited

U.S. PATENT DOCUMENTS

| 4,941,009 | A | * | 7/1990 | Yoshida | 396/121 |
|---|---|---|---|---|---|
| 5,220,375 | A | | 6/1993 | Ishida et al. | 354/419 |
| 6,859,618 | B1 | * | 2/2005 | Yip | 396/61 |
| 7,106,376 | B1 | * | 9/2006 | Anderson | 348/345 |
| 7,262,798 | B2 | * | 8/2007 | Stavely et al. | 348/255 |

FOREIGN PATENT DOCUMENTS

JP 2002-229092 8/2002

* cited by examiner

*Primary Examiner*—Ngoc-Yen Vu
*Assistant Examiner*—Peter Chon
(74) *Attorney, Agent, or Firm*—Fitzpatrick, Cella, Harper & Scinto (57) ABSTRACT

There is provided an image-taking apparatus which sets a proper exposure time with repressing camera shake in accordance with a situation of an object. This image-taking apparatus comprises an image-pickup element which converts an object image into an image signal and a controller which determines an exposure time of the image-pickup element, wherein the controller sets a maximum value of an exposure time of the image-pickup element in accordance with a size of an area which satisfies a predetermined condition for a distance of the object.

4 Claims, 7 Drawing Sheets

IMAGE-TAKING APPARATUS FOR SETTING MAXIMUM EXPOSURE TIME AND CONTROL METHOD THEREFOR

BACKGROUND OF THE INVENTION

1. Field of the Invention

The present invention relates to an exposure control of an image-taking apparatus, and more particularly, to an apparatus image-taking apparatus which has a distance detection unit for detecting distances of a plurality of points and an illumination unit.

2. Description of the Related Art

In image-taking apparatuses such as silver-halide film cameras, digital cameras, etc., in which operations such as an exposure setting, a focusing adjustment, etc. are automated, users who are not familiar with camera operations are able to take proper images by using image-taking apparatuses when objects satisfy normal conditions.

When an object is dark, by flashing an illumination unit built in a camera or connected to a camera, it is possible to operate the camera so as to improve the luminance of the object. On the other hand, when an object is dark and also when the object is far away from the illumination unit so that illuminated light is faint at the object, it is possible to increase the luminance of the object for a camera by using a longer exposure time.

However, when an exposure time becomes longer, there is a possibility to be influenced from camera shake. For this reason, during image-taking which requires a longer exposure time than a certain exposure time (for example, one-sixths of a second), it may happen that a camera has an insufficient exposure time, and it is arranged to perform image-taking by setting an upper limit to the exposure time (maximum exposure time) by preferentially repressing camera shake. In this case, the setting time is referred to, hereinafter, as a "shutter finish time" and set to, for example, one-sixth of a second. Further, the exposure time defined here includes both the exposing time determined by a mechanical shutter which shields light from reaching an image-pickup element by a light damper blade and the exposing time determined by an electronic shutter made of a photoelectric conversion element such as CCD. By forcing image-taking into finishing within the exposure time of one-sixth of a second, it is possible to repress camera shake, but there may be cases where an exposure can be insufficient for objects.

For this reason, Japanese Patent Application Laid-Open No. 2002-229092 discloses a structure in which camera shake and low exposure are arranged to be balanced by changing a shutter finish time according to image-taking modes.

However, in the structure which selects the shutter finish time according to an image-taking mode, when a user does not have sufficient knowledge of a camera, it is possible for the user to select an improper shutter finish time. For example, when the distance of a background object is similar to the distance from a main object, the luminance of the background becomes bright due to light irradiated from an illumination unit, and it is not necessary to make the shutter finish time longer. In such cases, since the possibility of insufficient exposure is low, it is more important to repress camera shake, and the shutter finish time should be shortened. On the contrary, when the distance from the background object is significantly larger compared to the distance from the main object, it is necessary to make the shutter finish time longer in order to perform image-taking by obtaining a brighter background.

As described above, even when the luminance of a object is substantially similar, it is preferable to select the shutter finish time appropriate to the distance from the camera to the background object.

SUMMARY OF THE INVENTION

According to one aspect of the present invention, an image-taking apparatus comprises an image-pickup element which converts an object image into an image signal, a controller which determines an exposure time of the image-pickup element in accordance with a luminance of the object image wherein the controller determines the exposure time within a predetermined maximum exposure time, and a distance detection unit which detects a distance of the object on an image-taking surface. Furthermore, the controller sets the maximum exposure time in accordance with a size of an area which satisfies a predetermined distance condition.

In addition, according to one aspect of the present invention, an image-taking apparatus comprises an image-pickup element which converts an object image into an image signal, a controller which determines an exposure time of the image-pickup element in accordance with a luminance of the object image wherein the controller determines the exposure time within a predetermined maximum exposure time, and a distance detection unit which detects a distance of the object on an image-taking surface. Furthermore the controller sets the maximum exposure time in accordance with a size and position of a size which satisfies a predetermined distance condition.

In addition, according to one aspect of the present invention, a control method of an image-taking apparatus comprises a step of detecting a distance of an object on an image-taking surface, a step of setting a maximum value of an exposure time of an image-pickup element which converts an object image into an image signal in accordance with a size of an area where the distance of the object satisfies a predetermined condition, and a step of determining the exposure time of the image-pickup element in accordance with a luminance of the object image so that the exposure time is set within the maximum value.

In addition, according to one aspect of the present invention, a control method of an image-taking apparatus comprises a step of detecting a distance of an object on an image-taking surface, a step of setting a maximum value of an exposure time of an image-pickup element which converts an object image into an image signal in accordance with an size and position of an area where the distance of the object satisfies a predetermined condition, and a step of determining an exposure time of the image-pickup element in accordance with a luminance of the object image so that the exposure time is set within the maximum.

DETAILED DESCRIPTION OF THE PREFERRED EMBODIMENTS

Hereinafter, preferred embodiments of the present invention will be explained by referring to the drawings.

Figure 1:
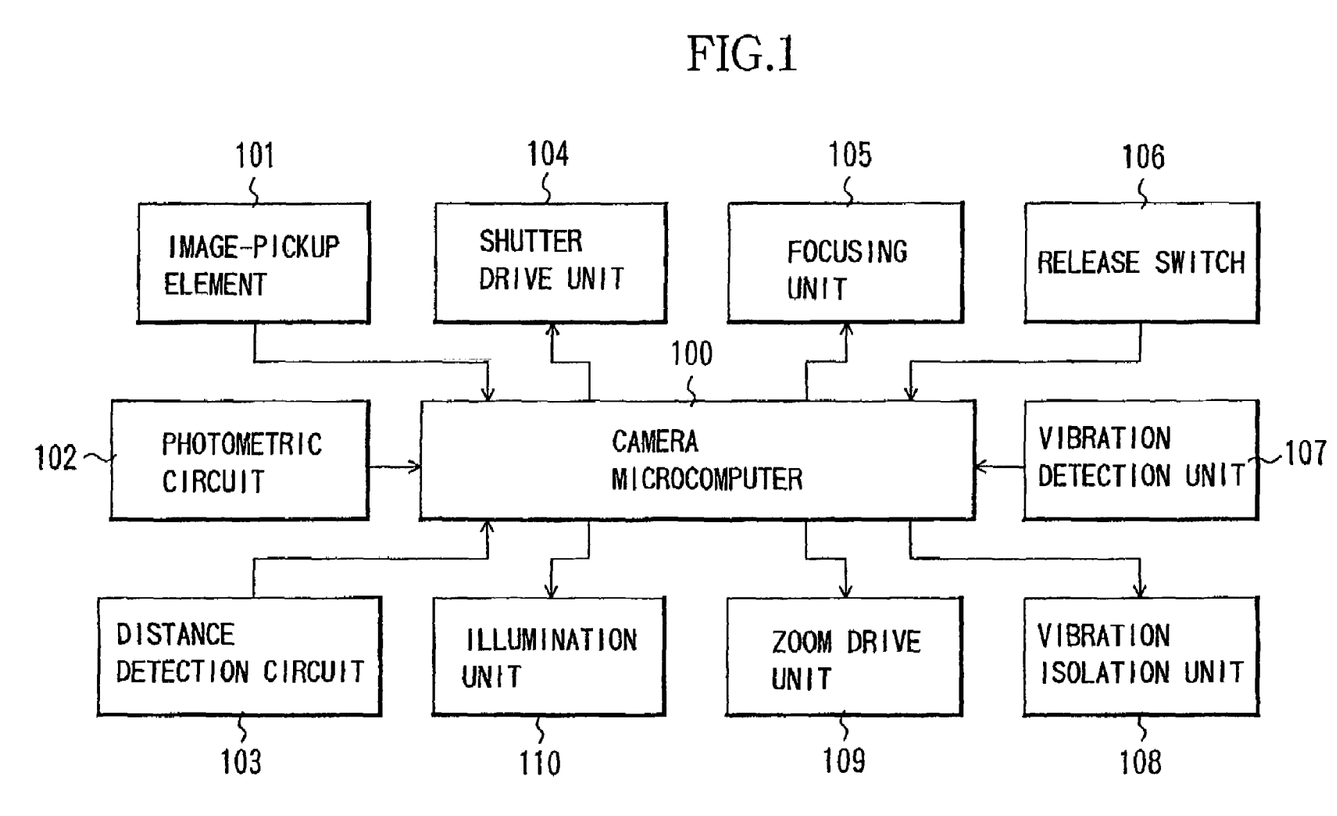
FIG. 1 shows a block diagram of an image-taking apparatus according to the present invention.

FIG. 1 shows a block diagram of a camera structure of an image-taking apparatus of the present invention. Here, an example of a digital camera will be explained. Further, image-taking refers to the recording of image data in a recording media for the purpose of storage, and also refers to the recording of image data in a recording media temporarily, allowing a user to select whether or not the image data is stored.

Reference numeral 100 denotes a microcomputer (CPU) which performs the overall control of the camera. Reference numeral 101 denotes an image-pickup element which converts an object image into an electronic image signal. Reference numeral 102 denotes a photometric circuit which divides an image-taking surface into a plurality of areas and measures photometry values by a plurality of photometry modes such as average photometry, central weighted photometry, spot photometry, etc. by converting weightings of luminance values obtained at all the areas.

Figure 2A:
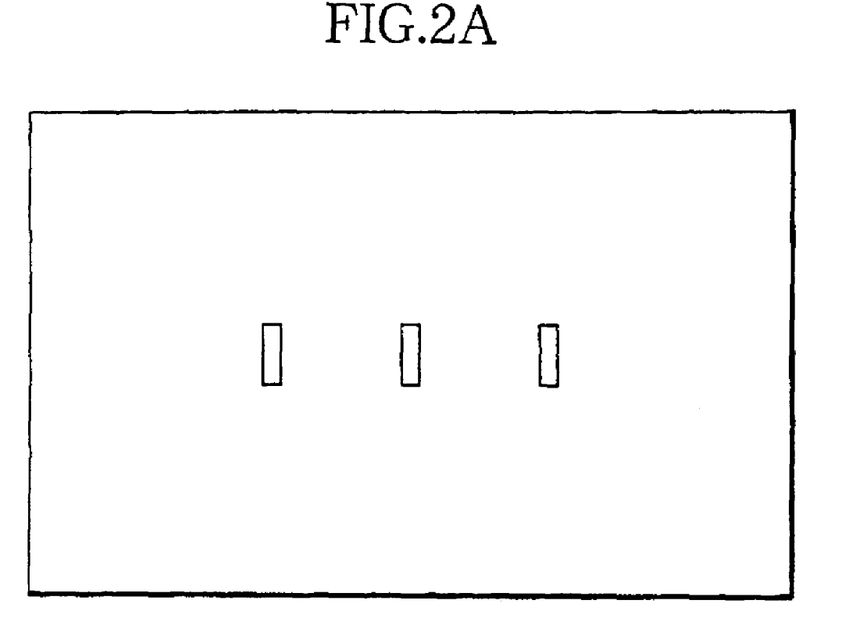
FIG. 2A and FIG. 2B show examples of distance detection areas of the image-taking apparatus of the present invention.
Figure 2B:
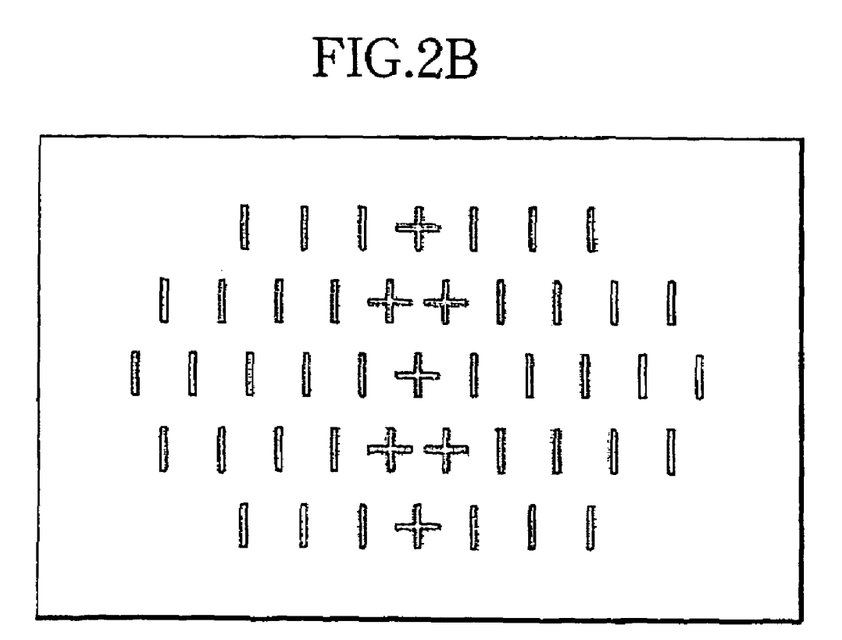

FIG. 2 shows examples of the distance detection areas. FIG. 2A is a diagram showing the distance detection areas of the camera in which distance detection is performed at 3 points. In FIG. 2A, the outer frame indicates the image-taking surface, and the 3 rectangular areas shown inside the figure indicate the distance detection areas. FIG. 2B is a diagram showing the distance detection areas of the camera in which distance detection is performed at 45 points. In FIG. 2B, the outer frame indicates the image-taking surface, and the 7 cross-type frames and 38 rectangular frames shown inside the figure indicate the distance detection areas.

In FIG. 1, reference numeral 104 denotes a shutter drive unit which shields exposure light from the image-pickup element and drives a mechanical shutter provided in front of the light axis with respect to the image-pickup element. Further, the shutter drive unit may control an electronic shutter function which controls an accumulation time by controlling the drive signal of the image-pickup element inputted into the image-pickup element. Reference numeral 105 denotes a focusing unit which, based on the distance detection value obtained by the distance detection circuit 103, focuses a main object image on the image-pickup element by driving focusing lenses of an image-taking lens group (not shown). Reference numeral 106 denotes a release switch which performs a focusing operation and preparatory operation of exposure control for preparing image-taking of the camera by switching to a first step (SW1 turned on) and performs image-taking with the exposure control by switching to a second step (SW2 turned on). Reference numeral 107 denotes a vibration detection unit, such as a gyro etc., which detects a vibration of the camera body. Reference numeral 108 denotes a vibration isolation unit which, responding to an output signal of the vibration detection unit 107, cancels out the vibration of the camera by adjusting the relative position between the image-taking lens group and the image-pickup element. Further, whether this vibration isolation unit 108 is operated or not may be selected by a camera user. Reference numeral 109 denotes a zoom drive unit which, by driving the zoom lenses of the image-pickup lens group, performs magnification or demagnification of an object image formed on the image-taking element. Reference numeral 110 denotes an illumination unit which may be built in the camera body or connected to the camera by wire cabling or wireless arrangement which allows communication. This illumination unit 110 emits an amount of light in accordance with an instruction from the camera.

Embodiment 1

Next, in a camera having 3 points of distance detection areas shown in FIG. 2A, image-taking drive control by a microcomputer 100 will be explained in reference to a flow chart of FIG. 3.

When a user of a camera lowers a release switch 106 to a first stage (SW1 turned on), in Step S201, the microcomputer 100, using an output from a distance detection circuit 103, measures the distance of an object at each distance detection area. The distance detection area overlapping with a main object is determined from the distance information obtained for each distance detection area. In the present embodiment, among the objects related to the 3 points of distance detection areas, the object which lies the nearest is specified to be the main object.

In Step S202, the microcomputer 100 drives a focusing unit 105 so as to focus the distance detection area specified in Step S201.

In Step S203, the microcomputer 100 obtains a luminance value for the whole area or a part of the image-taking surface based on an output of a photometric circuit 102 and calculates a photometry value by giving weightings around the central luminance of the area where the area is specified as the main object in Step S202.

In Step S204, the microcomputer 100 determines an exposure control value based on the photometry value calculated in Step S203. The exposure control value includes at least one of the following values: that is, an exposure time, an aperture value, and a gain value for output signals of an image-pickup element, an illumination time of an illumination unit 110, luminance amount of the illumination unit 110, etc.

In Step S205, the microcomputer 100 checks whether the illumination unit 110 is to emit light based on the exposure control value determined in Step S204, and, when the illumination unit emits light, goes to Step S206.

In Step S206, the microcomputer 100 checks whether a vibration isolation unit 108 is set to be in operation, and, when the vibration isolation unit 108 is set to be in operation, goes to Step S207.

In Step S207, the microcomputer 100 checks whether the difference between the distance information of the distance detection area in which the main object exists based on the output of the distance detection circuit 103 and the distance information in all the other distance detection areas is within a predetermined range, and, when it is within the predetermined range, goes to Step S208. When it is not within the predetermined range, the microcomputer 100 goes to Step S209. Further, when there are 2 distance detection areas each having a main object, the microcomputer 100 checks whether the difference between the distance information of at least one of these 2 distance detection areas and the distance information in the remaining distance detection areas is within the predetermined range, and also, when all the distance detection areas have a main object each, goes to Step S208.

In Step S208, the microcomputer 100 sets a first shutter finish time as an upper limit of the exposure time. For example, in the case of a single lens camera, it is a flash-synchronizable exposure time, and in the case of a lens shutter camera which utilizes light amount efficiently, a sufficient amount of time is set for opening a shutter blade, concurrently used for an aperture, to an opened state.

In Step S209, the microcomputer 100 sets a second shutter finish time by one or two steps longer than the first shutter finish time as the upper limit of the exposure time Since an effect of camera shake depends on a focal length of an image-taking lens, the shutter finish time is corrected appropriately in accordance with a drive position of the zoom lens or a magnification of an electronic zoom. To correct the shutter finish time, a function utilizing a magnification rate by the lens focal length or the electronic zoom may be used, or a table containing the magnification rate of the focal length of the image-taking lens or the electronic zoom and correction values may be used.

Here, in accordance with the difference between the distance information of the distance detector area having a main object and the distance information of all the other distance detection areas, the shutter finish time is to be changed. The reason for this will be explained in reference to FIG. 4.

Figure 4A:
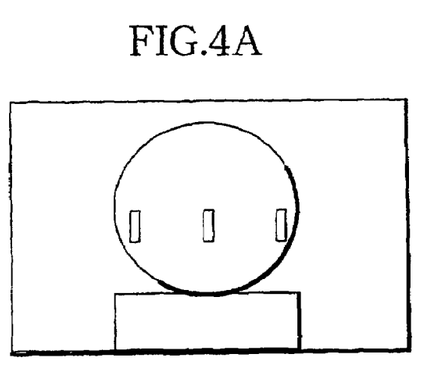
FIG. 4A to FIG. 4D show diagrams explaining the relation between an object distance and a shutter finish time according to Embodiment 1 of the present invention.
Figure 4B:
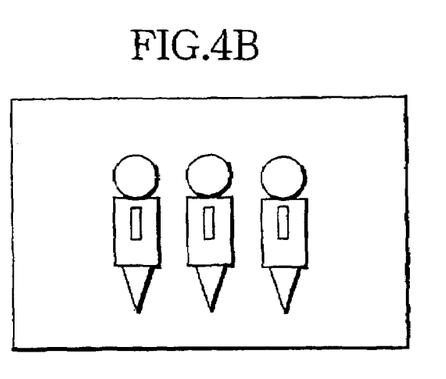
Figure 4C:
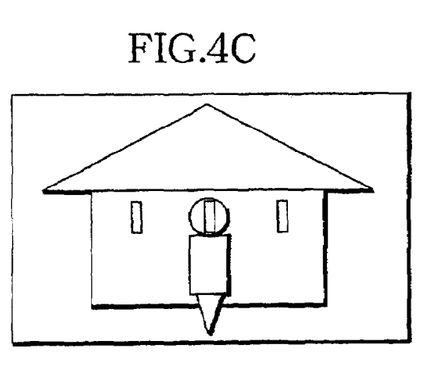

FIG. 4A shows a diagram in which an identical object overlaps all the distance detection areas. FIG. 4B shows a diagram in which each of 3 objects standing within a short distance overlaps each of the distance detection areas. FIG. 4C shows a diagram in which one person stands immediately in front of a house, this person overlaps one distance detection area, and the house overlaps the remaining 2 distance areas. And, FIG. 4D shows a diagram in which a person standing at a short distance overlaps the distance detector area at the center and the 2 distance detector areas at the left and right sides overlap the background scenery substantially at infinity.

In the situations shown in FIGS. 4A to 4C, differences among the distance detection values obtained from the 3 distance detector areas are small and the object overlapping all the distance detector areas are judged to lie within a short distance. That is, the probability that objects lying within a relatively short distance occupy the image-taking surface is large and it is very probable that the illumination unit 110 renders the luminance bright. Therefore, even for a shorter exposure time, there may be small areas where the exposure time becomes insufficient. Thus, by setting the shutter finish time at a relatively short time, exposure control operation is performed so as to further repress camera shake.

Figure 4D:
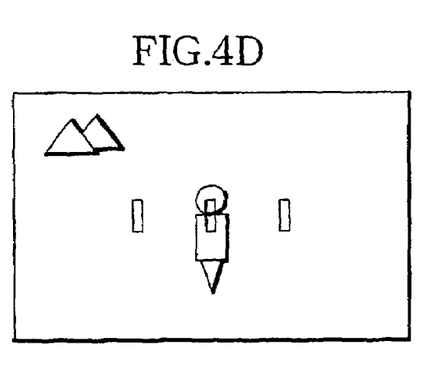

On the other hand, in the situation shown in FIG. 4D, the distance detection value obtained from the distance detection area at the center which is the nearest position (judged to be a main object) is quite different from the distance detection value obtained from the distance detection areas at the left and right sides, and it is considered that the objects overlapping the distance detection areas at the left and right sides lie at a long distance. That is, the probability that the object lying at a relatively short distance occupies the image-taking surface is small, and it is not probable that the illumination unit 110 is able to render the luminance brighter. Therefore, for a very short exposure time, there may be a large area where the luminance becomes extremely insufficient, and an image would turn out as if a main object would appear from the darkness. For this reason, by setting the shutter finish time to the second shutter finish time which is longer than the first shutter finish time, exposure control is performed such that the brightness of objects located at a long distance is improved.

In Step S210, when the microcomputer 100 detects a state in which a release switch 106 is pushed down to the second step, the microcomputer 100 goes to Step S211.

In Step S211, the camera performs image-taking operation. When the shutter finish time is set, and when the proper exposure time set in Step S204 is longer than this shutter finish time, an exposure to the image-pickup element is performed for the amount of time corresponding to the shutter finish time. When the proper exposure time set in Step S204 is shorter than this shutter finish time or when the illumination unit 110 is judged not to be used in Step S205, the exposure to the image-pickup element is performed just for the proper exposure time set in Step S204. In addition, the illumination unit 110 and the vibration isolation unit 108 are to be operated if needed. And, the microcomputer 100 terminates this processing when the image-taking is completed.

In addition, when a state is detected in which the release switch 106 is not pushed down to the second step, the microcomputer 100 goes to Step S212.

In Step S212, the microcomputer 100 checks whether the release switch 106 is kept in a state in which the release switch 106 is pushed down to the first step. When kept in the state in which the release switch 106 is pushed down to the first step, the microcomputer 100 goes to Step S210, and when not kept, this processing is terminated from the judgment that the image-taking is terminated.

In addition, in Step S206, when the vibration isolation unit 108 is not set to be in operation, the microcomputer 100 goes to Step S208 and sets the first shutter finish time. When the vibration isolation unit 108 is not operated, it is very probable to cause camera shake compared with the case where the vibration isolation unit 108 is operated. In order to repress this camera shake, the first shutter finish time having a shorter time is set.

In addition, in Step S205, when the illumination unit 110 is judged not to be used, since the object has sufficient luminance for image-taking, it is very improbable to cause camera shake. The microcomputer 100 goes to Step S210 without setting the shutter finish time and performs image-taking operation.

As described above, according to the present embodiment, the shutter finish time is set in accordance with comparison results of object distances in the plurality of distance detection areas. In consideration of the degree of achievement of illumination effects by the illumination unit 110, it is possible to achieve the repression of camera shake and the improvement of exposure condition of objects in a well-balanced manner.

Embodiment 2

Next, in a camera having 45 distance detection areas shown in FIG. 2B, image-taking drive control by a microcomputer 100 will be explained in reference to a flow chart of FIG. 5.

Figure 3:
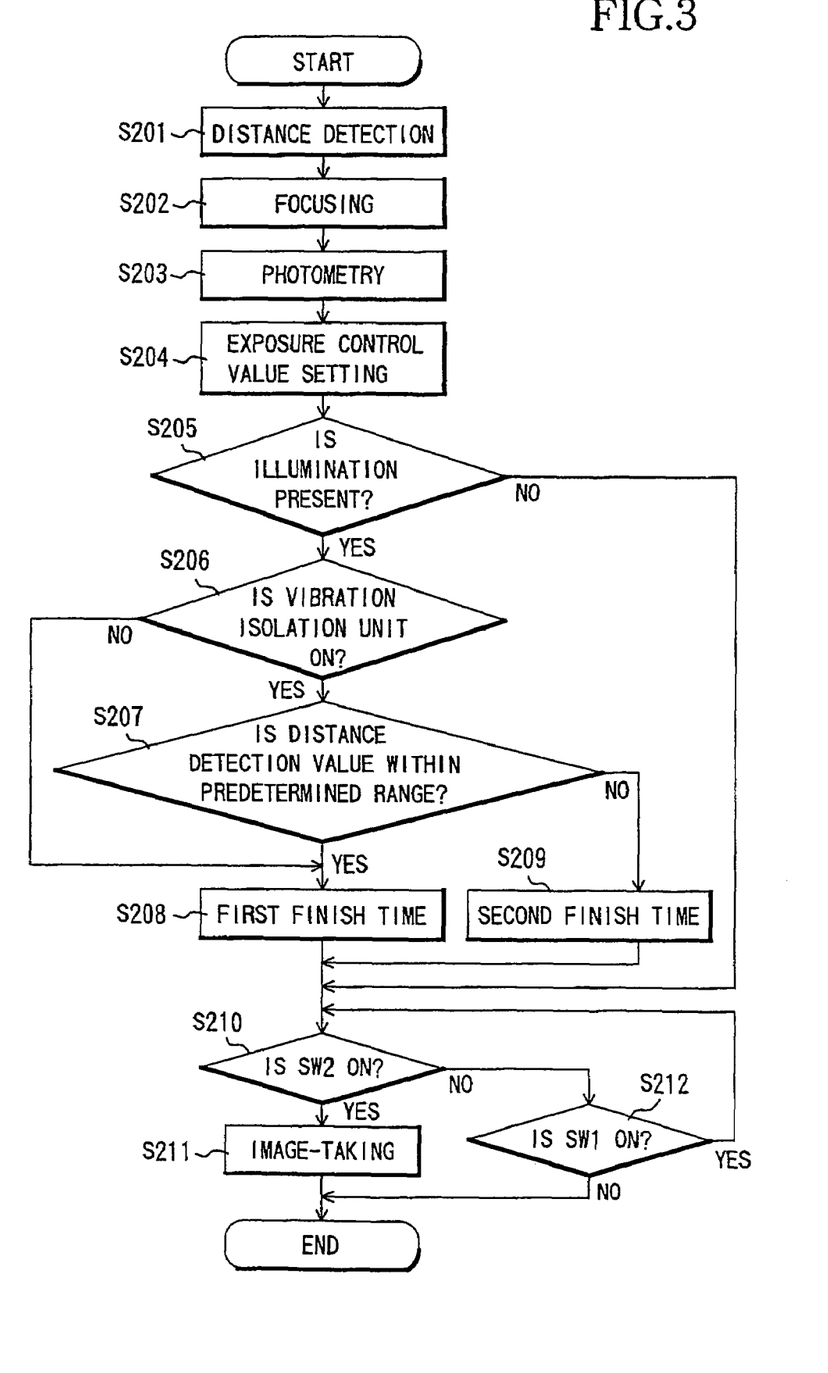
FIG. 3 shows a flow chart explaining the operation scheme of the image-taking apparatus according to Embodiment 1 of the present invention.
Figure 5A:
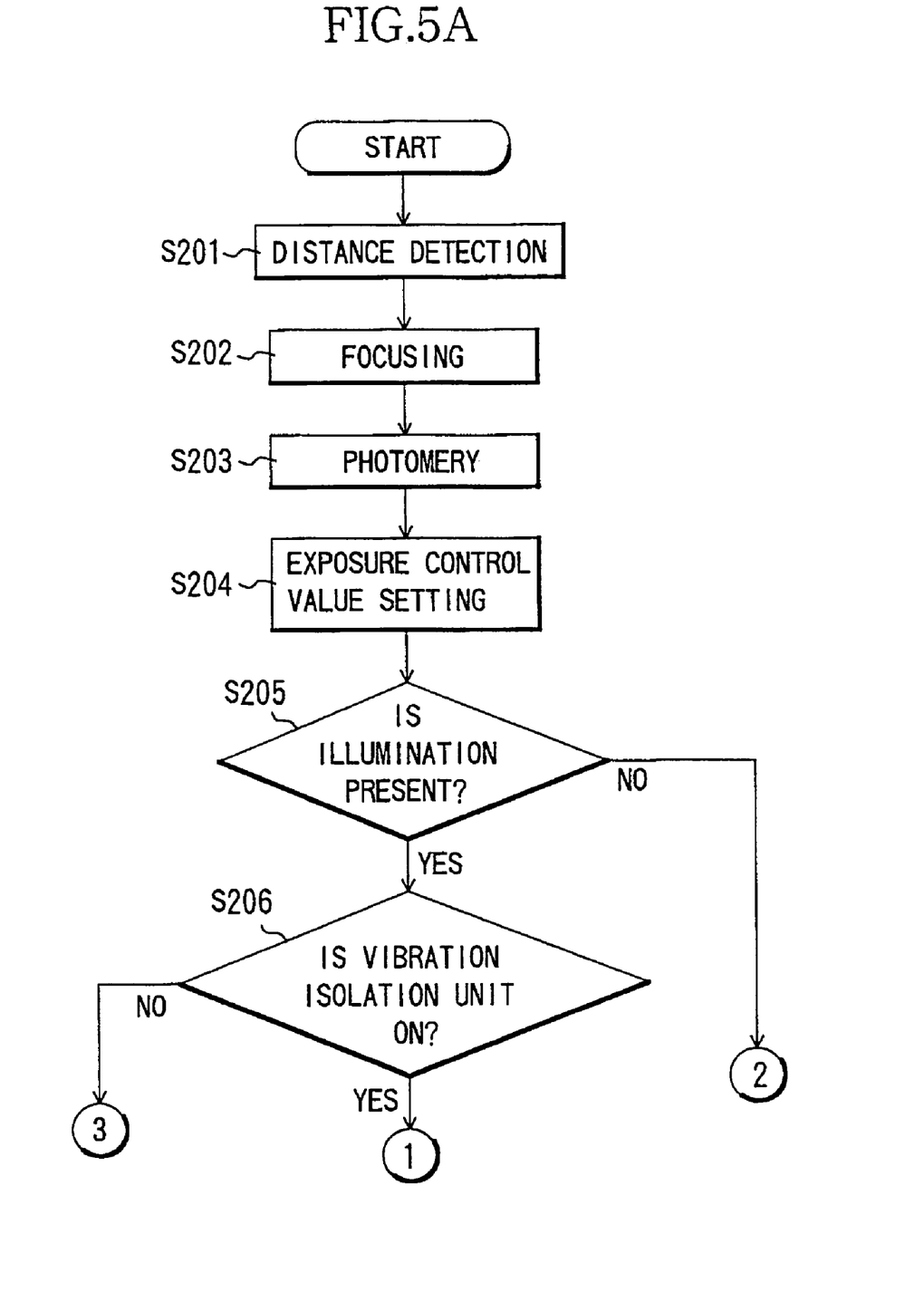
FIG. 5A and FIG. 5B show a flow chart explaining the operation scheme of the image-taking apparatus according to Embodiment 2 of the present invention.
Figure 5B:
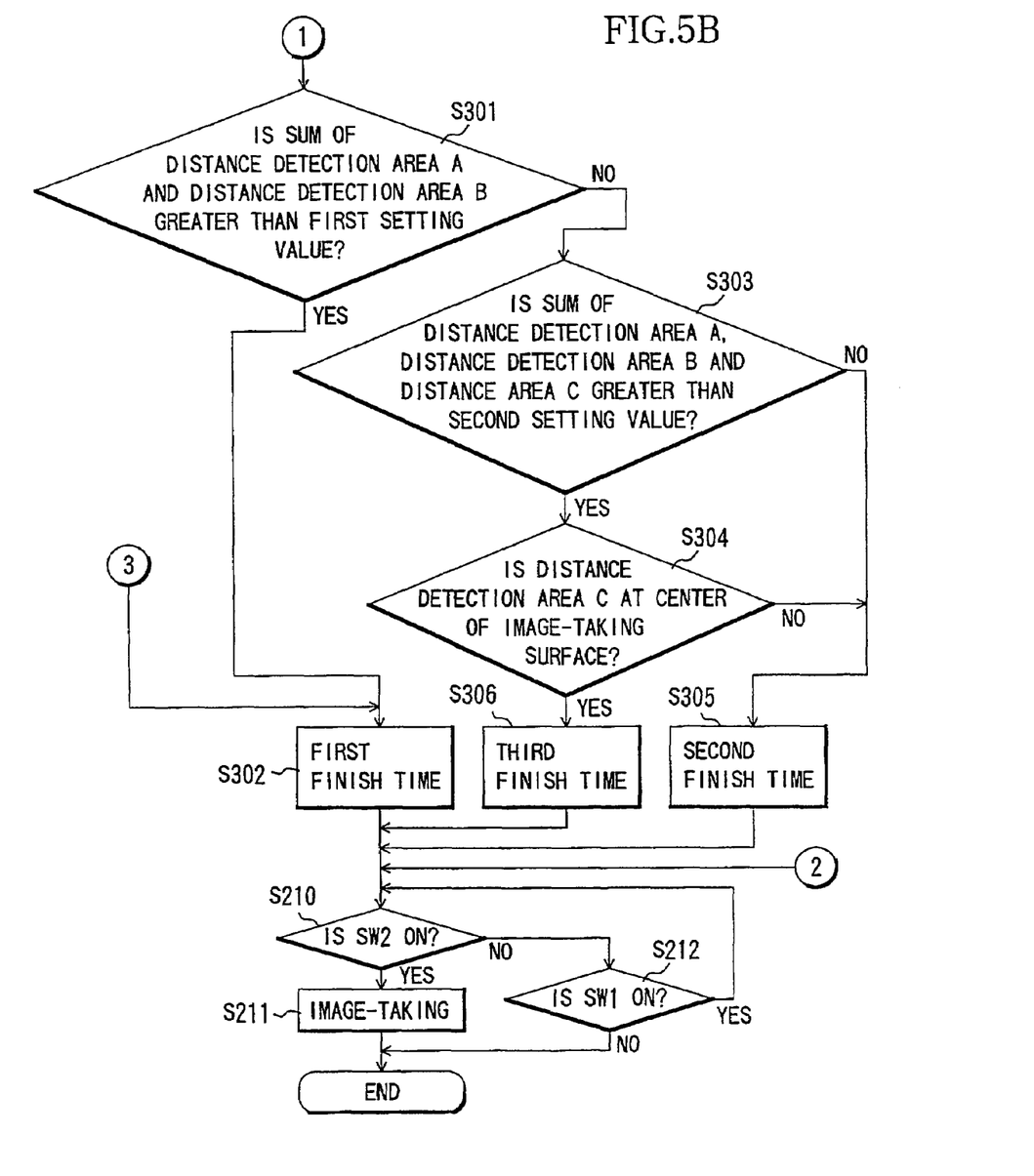

In the flow chart of FIG. 5, Steps S207 to S209 of FIG. 3 are replaced by Steps S301 to S306. Primarily, these replaced steps will be explained.

Further, in Step S201, a microcomputer 100, by using a known method such as a near-point priority algorithm method etc. in which distance detection areas near the center have larger weightings for a distance detection value, specifies only one or a plurality of distance detection areas having a main object.

In Step S206, the microcomputer 100 checks whether a vibration isolation unit 108 is set to be operated, and, when the vibration isolation unit 108 is set to be operated, goes to Step S301.

In Step S301, the microcomputer 100 checks whether the sum of the fraction of distance detection areas having a main object (hereinafter, referred to as distance detection area A) with respect to the whole distance detection areas and the fraction of distance detection areas in which the differences between the distance information in distance detection areas having a main object and that of the distance detection area A are within a first predetermined range (hereinafter, referred to as distance detection area B) with respect to the whole distance detection areas is greater than or equal to a first predetermined value. When the sum is greater than or equal to the first predetermined value, the microcomputer 100 goes to Step S302, and when the sum is less than the first predetermined value, the microcomputer 100 goes to Step S303. Furthermore, when the distance detection area A has a plurality of distance detection areas, all the distance detection areas whose difference between the distance information from that of at least one of the plurality of distance detection areas and that of the distance detection area A is within the first predetermined range are judged to belong to the above-mentioned distance detection area B.

In Step S302, the microcomputer 100 sets a first shutter finish time as an upper limit of an exposure time. For example, in the case of a single lens reflex camera, it is a flash-synchronizable exposure time, and in the case of a lens shutter camera which utilizes light amount efficiently, a sufficient amount of time is set for opening a shutter blade, concurrently used for an aperture, to an opened state. Then, the microcomputer 100 goes to Step S210.

In Step S303, the microcomputer 100 checks whether the sum of the fraction of the distance detection area A with respect to the whole distance detection areas, the fraction of the distance detection area B with respect to the whole distance detection areas, and the fraction of the distance detection areas in which the differences between the distance information in distance detection areas having a main object and those of the distance detection areas A and B are outside of the first predetermined range and within a second predetermined range (hereinafter, referred to as distance detection area C) with respect to the whole distance detection areas is larger than or equal to a second predetermined value. When the sum is larger than or equal to the second predetermined value, the microcomputer 100 goes to Step 304, and when the sum is smaller than the second predetermined value, the microcomputer 100 goes to Step S305. Here, the second predetermined range is set to a wider range than the first predetermined range. In addition, the second predetermined value may be set to a value equal to or larger than the first predetermined value.

In Step S304, the microcomputer 100 checks whether or not the distribution condition of the distance detection area C is concentrated near the center of the image-taking surface. This judgment is made as follows. That is, the microcomputer 100 gives larger weightings to the distance detection areas of the distance detection area C when they are distributed closer to the center, and the sum of these weightings is judged to be larger than or equal to a threshold value. The microcomputer 100, when the distribution condition of the distance detection area C is judged to be predominantly near the center, goes to Step S306, and otherwise, goes to Step S305.

In Step S305, the microcomputer 100 sets a second shutter finish time longer by one or two steps than the first shutter finish time as an upper limit of exposure time.

In Step S306, the microcomputer 100 sets a third shutter finish time which is longer than the first shutter finish time and shorter than the second shutter finish time as an upper limit of exposure time.

Since an effect of camera shake depends on a focal length of an image-taking lens, the shutter finish time is corrected appropriately in accordance with a drive position of the zoom lens or a magnification of an electronic zoom. To correct the shutter finish time, a function utilizing a magnification rate by the lens focal length or an electronic zoom may be used, or a table containing the magnification rate of the focal length of the image-taking lens or the electronic zoom and correction values may be used.

Here, the reason why the first shutter finish time, the second shutter finish time, and the third shutter finish time are selectively used will be explained in reference to FIG. 6.

Figure 6A:
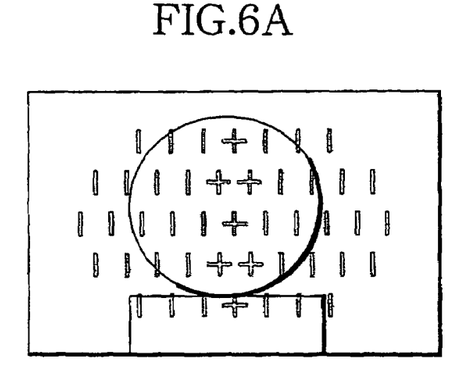
FIG. 6A to FIG. 6D show diagrams explaining the relation between an object distance and a shutter finish time according to Embodiment 2 of the present invention.
Figure 6B:
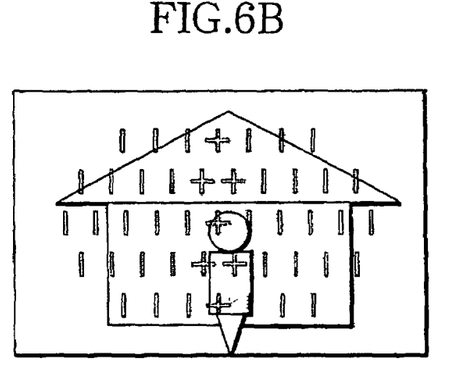
Figure 6C:
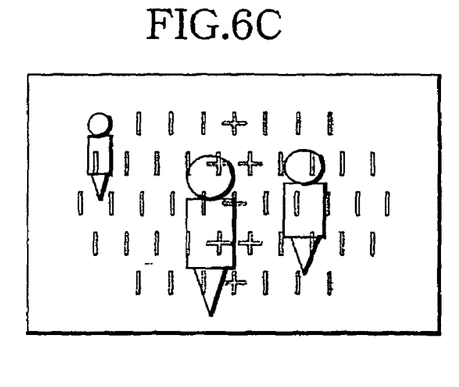
Figure 6D:
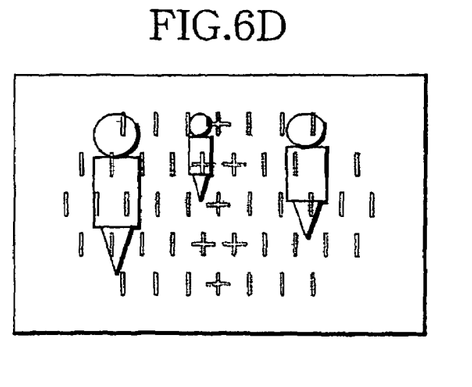

FIG. 6A shows a diagram in which a main object overlaps most of the 45 distance detection areas. FIG. 6B shows a diagram in which an object stands immediately in front of a house, this object overlaps one distance detection area near the center, and the house overlaps most part of the remaining distance detection areas. FIG. 6C shows a diagram in which two objects stand at a short distance from a camera and one object stands at a place relatively distant from the center of the image-taking surface. FIG. 6D shows a diagram in which two objects stand at a short distance from the camera and one object stands at a longer distance and near the center of the image-taking surface.

In the situation shown in FIG. 6A, since the area which overlaps the main object, that is, the distance detection area A, occupies a large fraction of the image-taking surface, much attention may not be paid to an exposure time for the background. Therefore, the shutter finish time is set to the first shutter finish time that is the shortest. In the situation shown in FIG. 6B, the area where the main object overlaps objects near the main object, that is, the distance detection area A and the distance detection area B, occupies a large fraction of the image-taking surface. Thus, illumination light from the illumination unit 108 reaches sufficiently to most part of the image-taking surface, and since the area having insufficient exposure time is small, the shutter finish time is set to the first shutter finish time that is the shortest. Further, in a manner similar to Embodiment 1, when a vibration isolation unit 108 is set not to be operated, it is highly probable to cause camera shake, and the first shutter finish time having a much shorter time is set.

In the situation shown in FIGS. 6C and 6D, the two objects standing in the front side are main objects and the distance detection areas overlapping these objects belong to the distance detection area A. The difference between the person standing in the distance (hereinafter, referred to as a third object) and the distance information of the main objects is outside of the first predetermined range and within the second predetermined range. Thus, the distance detection areas overlapping the third object belong to the distance detection area C. In this case, the third object is at the place where the luminance effect can be somewhat enhanced by illumination of the illumination unit 110.

When this third object is near the center of the image-taking surface, even at a somewhat long distance, it is highly probable that a user of the camera recognizes this third object as a part of the main objects. Therefore, when the third object is judged to be near the center of the image-taking surface, the shutter finish time is set so that an exposure condition is achieved as properly as possible at the distance detection area C in addition to the distance detection areas A and B.

On the contrary, when the third object is away from the center of the image-taking surface, regardless of the intention of the camera user, it is highly probable that this object accidentally may appear on the image-taking surface. Therefore, considering that the object overlapping the distance detection area C is simply a part of the background, the shutter finish time is to be controlled.

That is, when the object overlapping the distance detection area C is near the center of the image-taking surface, and when the fraction of the sum of the distance detection area A, the distance detection area B, and the distance detection area C occupying the image-taking surface is larger than or equal to the second predetermined value, insufficient exposure for the remaining area may not be problematic. In this case, the third shutter finish time having a sufficient time, that can provide a proper exposure condition to the distance detection area C, is set.

In addition, when the object overlapping the distance detection area C is not near the center of the image-taking surface, in a manner similar to Embodiment 1, the shutter finish time is set in accordance with the fraction of the sum of the distance detection area A and the distance detection area B occupying the image-taking surface.

As described above, according to this embodiment, the shutter finish time is set in accordance with comparison results of object distances in the plurality of distance detection areas and the position information of the objects. In consideration of the degree of achievement of illumination effects by the illumination unit 110, it is possible to achieve the repression of camera shake and the improvement of exposure condition of objects in a well-balanced manner.

As many apparently widely different embodiments of the present invention can be made without departing from the spirit and scope thereof, it is to be understood that the invention is not limited to the specific embodiments thereof except as defined in the appended claims.

While preferred embodiments have been described, it is to be understood that modification and variation of the present invention may be made without departing from the scope of the following claims.

"This application claims priority from Japanese Patent Application No. 2003-417346 filed on Dec. 15, 2003, which is hereby incorporated by reference herein."

What is claimed is:

1. An image-taking apparatus comprising:
   an image-pickup element which converts an object image into an image signal;
   an exposure control unit which controls an exposure time of the image-pickup element;
   a distance detection unit which is adapted to detect a distance between the object and the image-taking apparatus in a plurality of distance detection areas;
   a determination unit which determines a main object based on distance information detected by the distance detection unit; and
   an area detection unit which is adapted to detect a first distance detection area in which a difference from the distance information in a second distance detection area falls within a first predetermined range, and detect a third distance detection area in which a difference from the distance information in the second area falls within a second predetermined range larger than the first predetermined range, the first distance detection area being an area in which the main object exists, the second and third detection areas being areas in which the object other than the main object exists,
   wherein the exposure control unit sets a first time as a maximum exposure time when a fraction of the first and second distance detection areas with respect to a whole distance detection area is larger than a first predetermined value, and
   wherein the exposure control unit sets a second time longer than the first time as the maximum exposure time when the fraction of the first and second distance detection areas is smaller than the first predetermined value and a fraction of the first, second and third distance detection areas with respect to the whole distance detection areas is smaller than a second predetermined value which is equal to or larger than the first predetermined value.

2. The image-taking apparatus according to claim 1, wherein the exposure control unit sets a third time longer than the first time and shorter than the second time as the maximum exposure time when the fraction of the first, second and third distance detection areas is larger than the second predetermined value and a distribution condition of the third distance detection area is concentrated near a center of the image-taking surface, and
wherein the exposure control unit sets the second time as the maximum exposure time when the fraction of the first, second and third distance detection areas is larger than the second predetermined value and the distribution condition of the third distance detection area is not concentrated near a center of the image-taking surface.

3. A control method of an image-taking apparatus comprising:
   a first step of detecting a distance between an object and the image-taking apparatus in a plurality of distance detection areas;
   a second step of determining a main object based on distance information detected in the first step;
   a third step of detecting a first distance detection area in which a difference from the distance information in a second distance detection area falls within a first predetermined range, and detecting a third distance detection area in which a difference from the distance information in the second area falls within a second predetermined range larger than the first predetermined range, the first distance detection area being an area in which the main object exists, the second and third detection areas being areas in which the object other than the main object exists; and
   a fourth step of setting a maximum value of an exposure time of an image-pickup element which converts an object image into an image signal,
   wherein, in the fourth step, a first time is set as a maximum exposure time when a fraction of the first and second distance detection areas with respect to a whole distance detection area is larger than a first predetermined value, and
   wherein, in the fourth step, a second time longer than the first time is set as the maximum exposure time when the fraction of the first and second distance detection areas is smaller than the first predetermined value and a fraction of the first, second and third distance detection areas with respect to the whole distance detection areas is smaller than a second predetermined value which is equal to or larger than the first predetermined value.

4. The image-taking apparatus according to claim 1, wherein it is determined that a distribution condition of the third distance detection area is concentrated near the center when larger weightings are given to the third distance detection area closer to the center and a total weightings of the third distance detection area is equal to or larger than a threshold value.

* * * * *